US011187372B2

(12) United States Patent
Paré et al.

(10) Patent No.: US 11,187,372 B2
(45) Date of Patent: Nov. 30, 2021

(54) WEB MATERIAL DISPENSER, BACK WALL FOR A WEB MATERIAL DISPENSER AND METHOD FOR SECURING A WEB MATERIAL DISPENSER TO A SUPPORTING SURFACE

(71) Applicant: CASCADES CANADA ULC, Kingsey Falls (CA)

(72) Inventors: Richard Paré, Boucherville (CA); Antoine Dallaire, Montreal (CA); Marc-André L'Heureux, Candiac (CA)

(73) Assignee: CASCADES CANADA ULC, Kingsey Falls (CA)

( * ) Notice: Subject to any disclaimer, the term of this patent is extended or adjusted under 35 U.S.C. 154(b) by 20 days.

(21) Appl. No.: 16/574,261

(22) Filed: Sep. 18, 2019

(65) Prior Publication Data

US 2020/0096154 A1 Mar. 26, 2020

Related U.S. Application Data

(60) Provisional application No. 62/733,728, filed on Sep. 20, 2018.

(51) Int. Cl.
*A47K 10/38* (2006.01)
*F16M 13/02* (2006.01)
*A47K 10/22* (2006.01)
*A47K 10/32* (2006.01)

(52) U.S. Cl.
CPC ............. *F16M 13/02* (2013.01); *A47K 10/22* (2013.01); *A47K 10/38* (2013.01); *A47K 2010/3233* (2013.01)

(58) Field of Classification Search
CPC ............ A47K 10/3625; A47K 10/3612; A47K 10/36; A47K 2010/3668; A47K 10/3687
See application file for complete search history.

(56) References Cited

U.S. PATENT DOCUMENTS

| 5,752,622 | A | * | 5/1998 | Abell | A47K 10/38 221/281 |
| 7,984,872 | B2 | * | 7/2011 | Kuehneman | A47K 10/34 242/563.2 |
| 2002/0109036 | A1 | * | 8/2002 | Denen | A47K 10/38 242/560 |

* cited by examiner

*Primary Examiner* — Gene O Crawford
*Assistant Examiner* — Ayodeji T Ojofeitimi
(74) *Attorney, Agent, or Firm* — Marshall, Gerstein & Borun LLP

(57) ABSTRACT

The back wall for a web material dispenser having first and second web material support arms configured to support a web material supply. The back wall includes a fastening portion configured to mount the back wall to a supporting surface; a first support arm portion for the first web material support arm to be mounted thereto; and a weakness-providing junction at least partially circumscribing the first support arm portion from the fastening portion for the first support arm portion to be tiltable with respect to the fastening portion. Also, a web material dispenser including such a back wall and a method for securing a web material dispenser to a supporting surface.

26 Claims, 9 Drawing Sheets

WEB MATERIAL DISPENSER, BACK WALL FOR A WEB MATERIAL DISPENSER AND METHOD FOR SECURING A WEB MATERIAL DISPENSER TO A SUPPORTING SURFACE

PRIOR APPLICATION

The present application claims the benefit of the filing date of U.S. provisional patent application No. 62/733,728, filed on Sep. 20, 2018, and entitled "WEB MATERIAL DISPENSER AND BACK WALL FOR A WEB MATERIAL DISPENSER", the disclosure of which being hereby incorporated by reference in its entirety.

TECHNICAL FIELD

The present disclosure generally relates to a back wall for a web material dispenser. More particularly, the invention relates to a back wall that is configured to mount the web material dispenser to a supporting surface. The disclosure also relates to a web material dispenser including the back wall and to a method for securing a web material dispenser to a supporting surface, which can be uneven.

BACKGROUND

Several types of paper roll dispensers exist in the prior art, that are configured to be mounted to a wall and to support a paper roll of wound tissue paper and to dispense the tissue paper. Paper roll dispensers typically include, amongst others, a housing (or enclosure) defining a dispensing chamber and first and second paper roll support arms that are configured to support the paper roll for the paper roll to be rotated so as to deliver a portion of unwound tissue paper to the user.

It is particularly important for the first and second paper roll support arms to be aligned with each other, to ensure a smooth and easy dispensing of the paper to the user. However, when the wall to which the paper roll dispenser is mounted is uneven, the alignment of the first and second paper roll support arms might be compromised, thus resulting in an unsatisfactory dispensing of the paper.

In view of the above, there is a need for a web material dispenser and for a back wall for a web material dispenser which would be able to overcome or at least minimize some of the above-discussed prior art concerns.

BRIEF SUMMARY

It is therefore an aim of the present invention to address the above-mentioned issues.

According to a general aspect, there is provided a back wall for a web material dispenser having first and second web material support arms configured to support a web material supply. The back wall comprises a fastening portion configured to mount the back wall to a supporting surface; a first support arm portion, wherein the first web material support arm is securable thereto in a configuration wherein it extends forwardly therefrom; and a weakness-providing junction at least partially circumscribing the first support arm portion from the fastening portion for the first support arm portion to be tiltable with respect to the fastening portion.

According to another general aspect, there is provided a back wall for a web material dispenser having first and second web material support arms configured to support a web material supply. The back wall comprises a front face; an opposed rear face; a fastening portion configured to mount the back wall to a supporting surface; a first support arm portion configured to support the first web material support arm; and an isolating recess extending at least partially between the front and rear faces. The isolating recess partially surrounds the first support arm portion to at least partially physically isolate the first support arm portion from the fastening portion.

According to another general aspect, there is provided a web material dispenser for containing and dispensing a web material supply and being securable to a supporting surface. The web material dispenser comprises first and second web material support arms; and a back wall according to the present disclosure. The first web material support arm is mounted to the first support arm portion of the back wall.

According to another general aspect, there is provided a method for securing a web material dispenser to a supporting surface. The method comprises providing a web material dispenser having a back wall comprising a fastening portion, first and second support arm portions with first and second web material support arms secured thereto, the first and second web material support arms comprising first and second roll engagement portions, the back wall further comprising a first isolating recess partially surrounding the first support arm portion from the fastening portion to at least partially physically isolate the first support arm portion from the fastening portion; and mounting the fastening portion to the uneven supporting surface.

According to another general aspect, there is provided a back wall for a web material roll dispenser having first and second web material support arms configured to support a web material supply. The back wall comprises: a fastening portion configured to mount the back wall to a supporting surface; a first support arm portion for the first web material support arm to be mounted thereto, and having an outer periphery; and a flexible junction extending along at least a portion of the outer periphery of the first support arm portion and providing a weakness in a connection with the fastening portion.

According to another general aspect, there is provided a back wall for a web material dispenser having first and second web material support arms configured to support a web material supply. The back wall comprises: a front face; an opposed rear face; a fastening portion configured to mount the back wall to a supporting surface; a first support arm portion for the first web material support arm to be mounted thereto; and an isolation recess extending at least partially between the front and rear faces, the isolation recess partially surrounding the first support arm portion.

According to still another general aspect, there is provided a back wall for a web material dispenser having first and second web material support arms configured to support a web material supply. The back wall comprises: a fastening portion configured to mount the back wall to a supporting surface and having a peripheral border; a first support arm portion for the first web material support arm to be mounted thereto; and a flexible junction extending between the peripheral border of the fastening portion and the first support arm portion.

According to a further general aspect, there is provided a web material dispenser for containing and dispensing a web material supply and securable to a supporting surface. The web material dispenser comprises: at least one web material support arm; and a back wall securable to the supporting surface. The back wall has a back wall surface and: a rear face facing the supporting surface when the back wall is secured thereto, a front face opposed to the rear face. The back wall surface is dividable into: a fastening portion including a connection structure configurable to mount the back wall to the supporting surface; and at least one support arm portion having at least one of the at least one web material support arm mounted thereto and extending forwardly from the front face. The back wall further comprises at least one isolation strip at least partially circumscribing the at least one support arm portion from the fastening portion to at least partially physically isolate the at least one support arm portion from the fastening portion.

DETAILED DESCRIPTION

Figure 1:
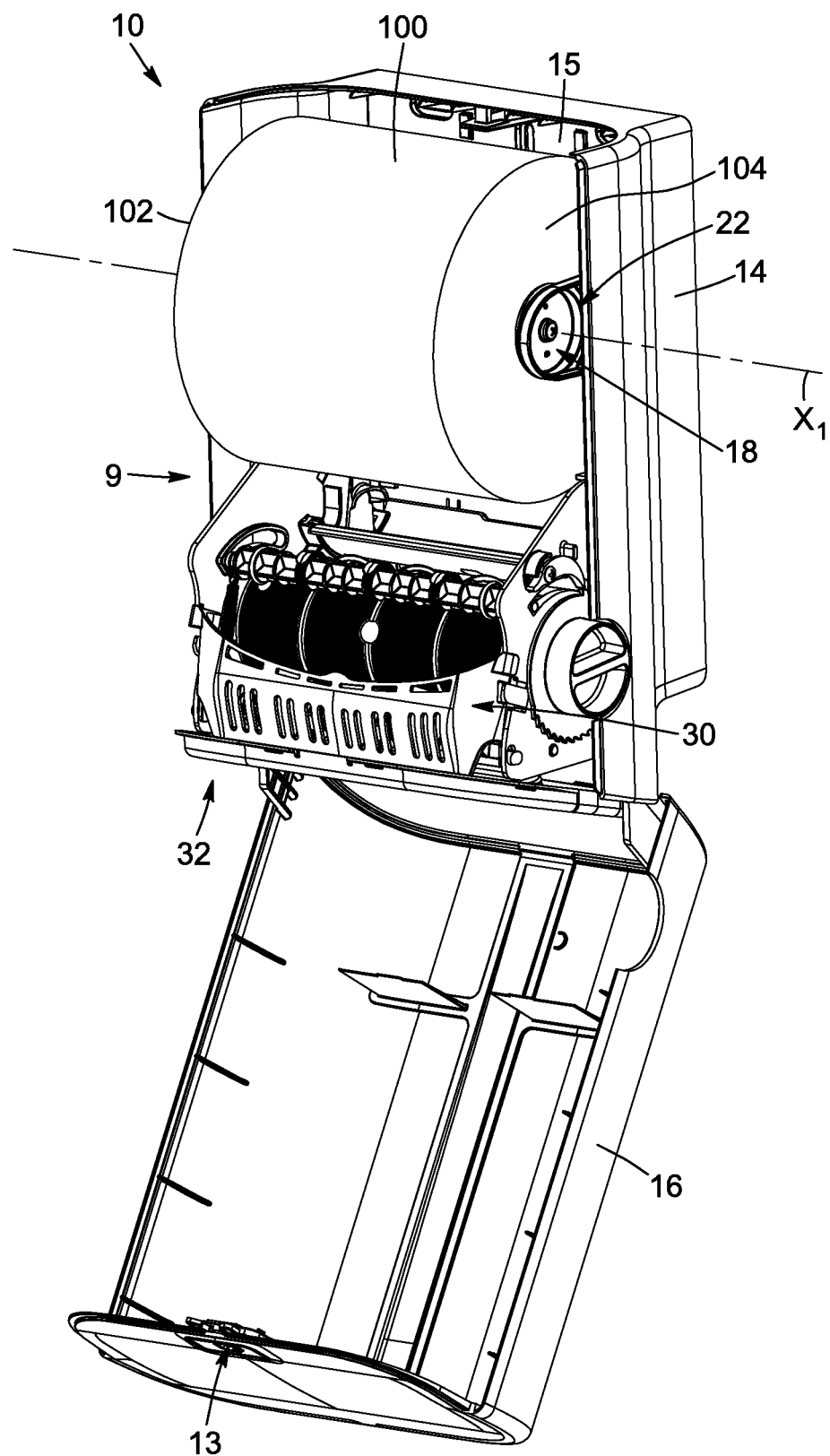
FIG. 1 is a front perspective view in accordance with an embodiment of a web material dispenser having a dispenser housing defining a dispensing chamber, the dispenser housing having a cover and a back wall, the web material dispenser further comprising a web material supply and a web material feed mechanism contained in the dispensing chamber, the dispenser housing being configured in an open configuration.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "forward", "rearward" "left", "right" and the like should, unless otherwise indicated, be taken in the context of the figures only and should not be considered limiting. Moreover, the figures are meant to be illustrative of certain characteristics of the web material dispenser and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment," "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

Web Material Dispenser

Figure 2:
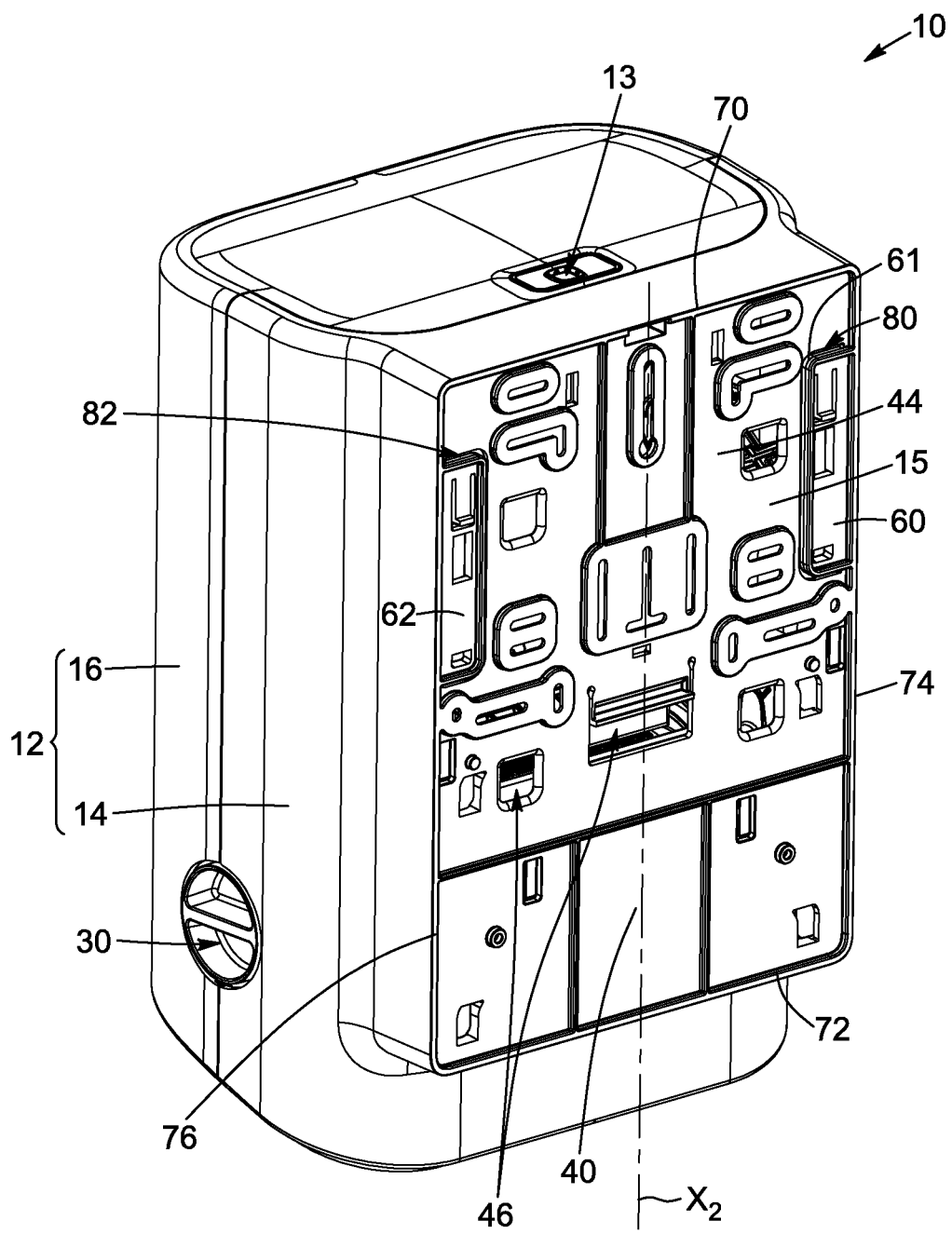
FIG. 2 is rear perspective view of the web material dispenser of FIG. 1, the dispenser housing being configured in a closed configuration.
Figure 3:
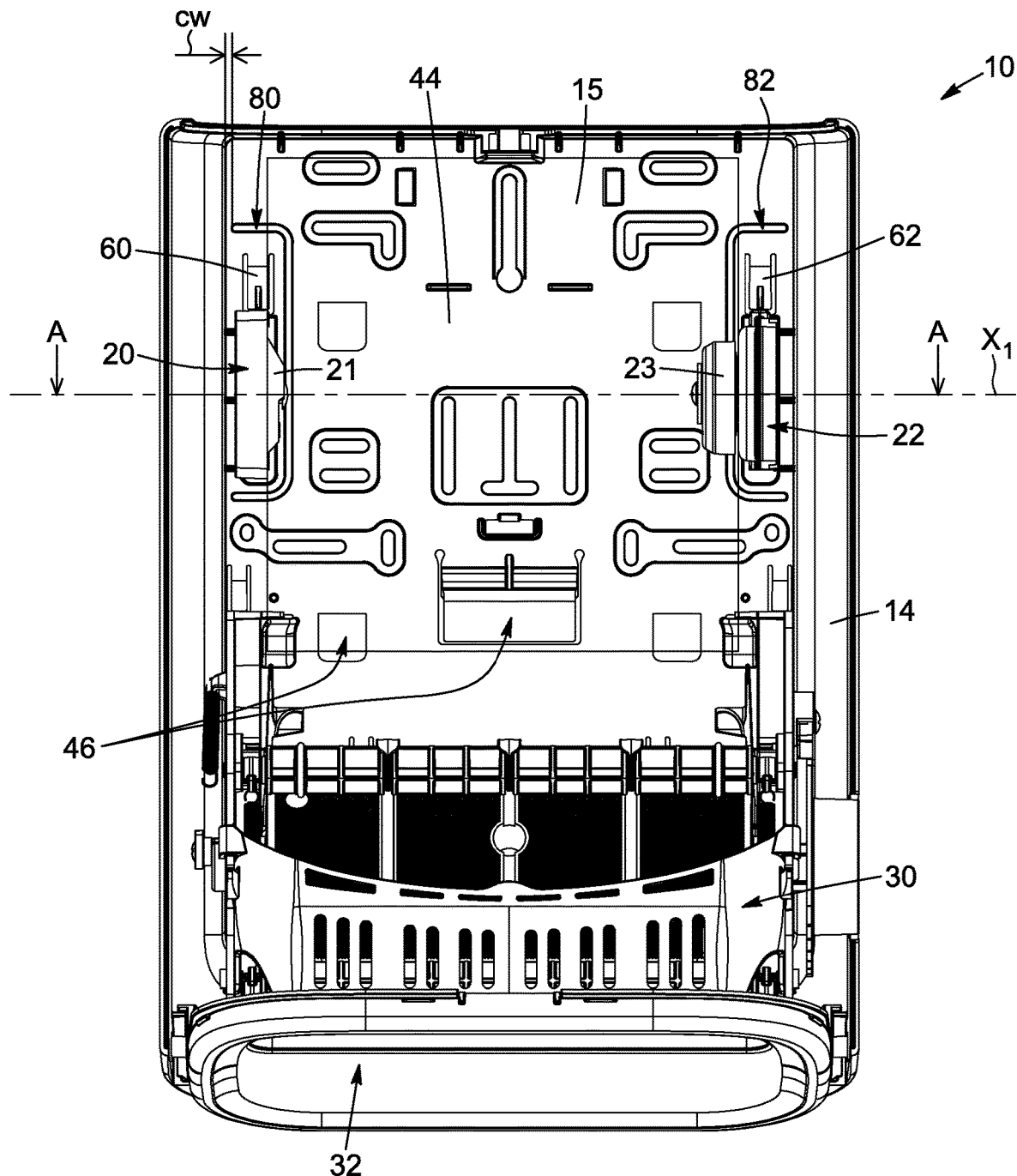
FIG. 3 is a front elevation view of the web material dispenser of FIG. 1, the cover of the dispenser housing and the web material supply being removed.

Referring now to the drawings, and more particularly to FIGS. 1 to 3, a web material dispenser 10 is shown. The web material dispenser 10 can be a dispenser for a web material supply, such as a paper tissue roll. In this specific example, the web material dispenser 10 is a manual or mechanical web material dispenser, but the disclosures apply to electric or electronic web material dispensers as well.

The web material dispenser 10 comprises a dispenser housing 12 (or dispenser enclosure 12) defining a dispensing chamber 9 and having a base part 14 and a cover 16. The base part 14 has a back wall 15 that is configured to be juxtaposed against and secured to a supporting surface W, for instance, a wall W or a mounting plate. The cover 16 is pivotally mounted to the base part 14, for instance in a lower section thereof. Therefore, the cover 16 and the base part 14 are movable relative to each other for the dispenser housing 12 to be selectively configurable in a closed configuration, in which the dispensing chamber 9 is at least partially closed, as represented in FIG. 2, and in an open configuration, as shown in FIG. 1, in which access is provided to the dispensing chamber 9. In the embodiment shown, as represented in FIG. 2, the web material dispenser 10 further comprises a locking assembly 13 configured to lock the cover 16 and the base part 14 together when the dispenser housing 12 is configured in the closed configuration.

The web material dispenser 10 further includes a web material support assembly 18, configured to support a web material supply 100 (in the embodiment shown, a web material roll 100). In the embodiment shown, the web material roll 100 has a central axis X1 and comprises first and second opposed extremities 102, 104 (or first and second opposed ends 102, 104). In the embodiment shown, the central axis X1 is substantially horizontal when the web material roll 100 is supported in the dispensing chamber 9 of the web material dispenser 10.

Figure 4:
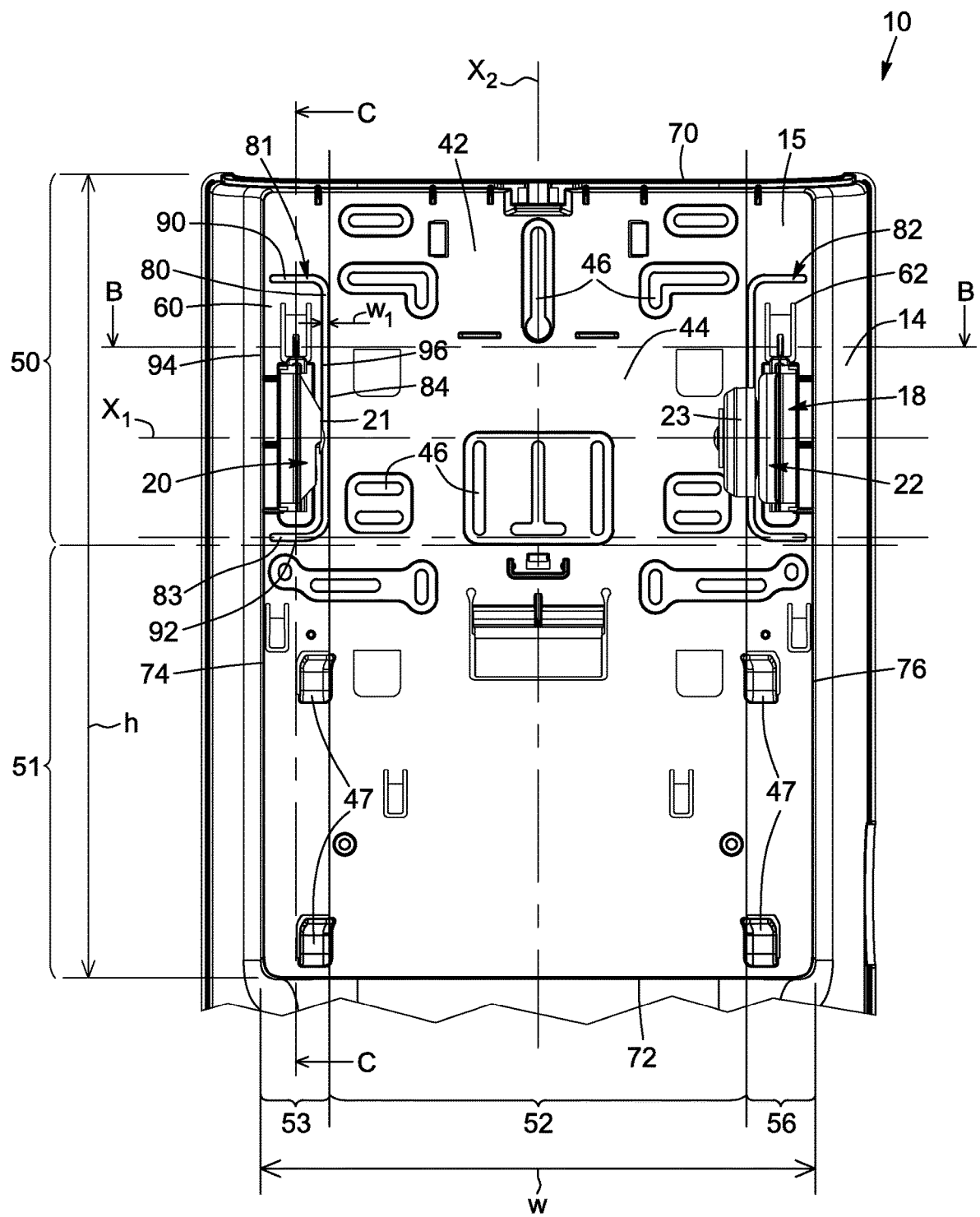
FIG. 4 is a front elevation view of an upper section of the web material dispenser of FIG. 3, the web material feed mechanism being removed.

The web material dispenser 10 also includes a web material feed assembly 30 that is configured to cause the web material dispenser 10 to dispense an amount of web material (or tissue paper) for use by a user. In the embodiment shown, the web material feed assembly 30 is mounted to the lower section of the base part 14 of the dispenser housing 12, but it can be arranged elsewhere. In the embodiment shown, the web material feed assembly 30 is mounted to a lower portion 51 of the back wall 15, for instance via hooks 47 protruding forwardly from the back wall 15, as represented in FIG. 4. Any other mechanical fastener configured to mount the web material feed assembly 30 to the dispenser housing 12 could be conceived.

The web material dispenser 10 further includes a dispenser opening 32 (or dispenser mouth) through which the web material is dispensed to the user upon actuation of the web material feed assembly 30. In the embodiment shown, the dispenser opening 32 is formed in the lower section of the base part 14 of the dispenser housing 12, but it can be located elsewhere.

It is appreciated that the shape and the configuration of the dispenser housing 12 and the shape, the configuration, and the location of the web material feed assembly 30 and the dispenser opening 32 can vary from the embodiment shown.

Web Material Support Assembly

Figure 5:
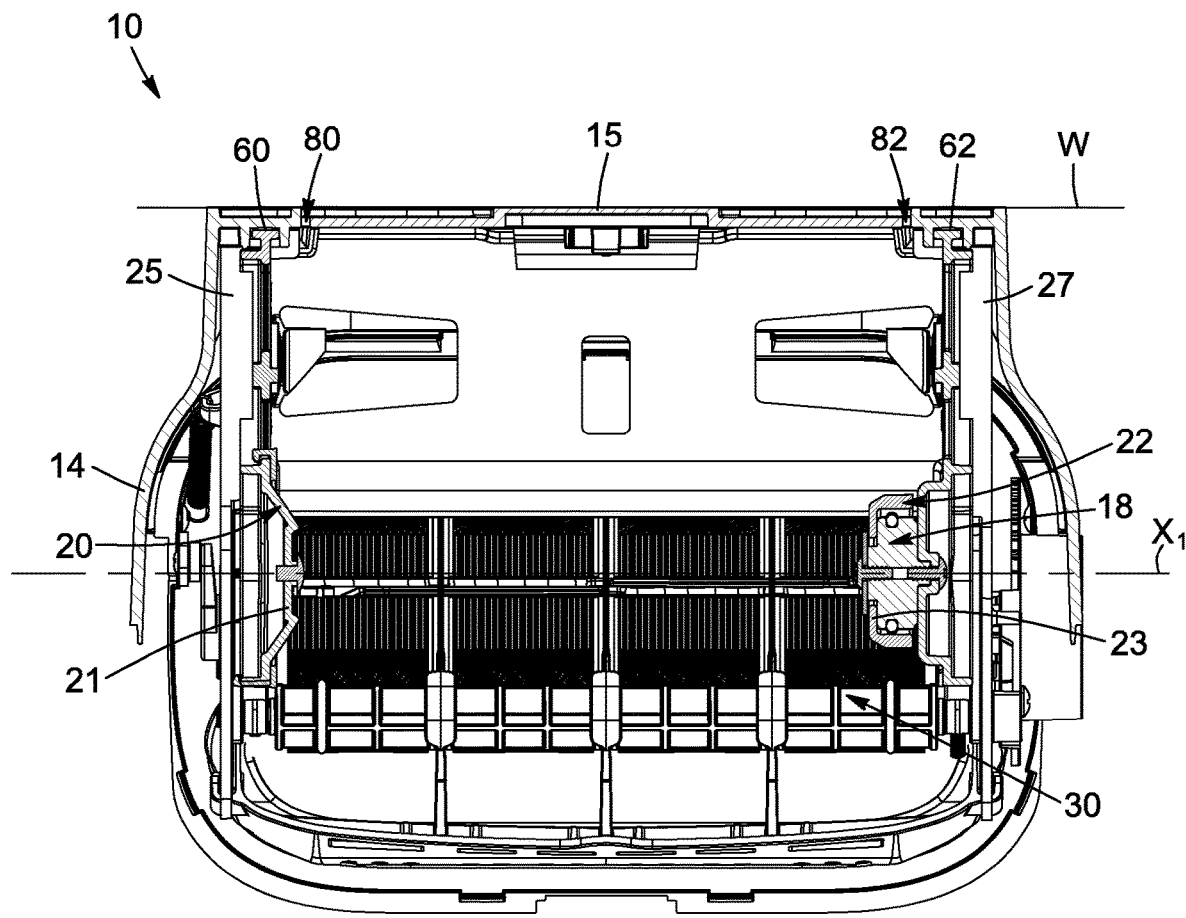
FIG. 5 is a sectional view of the web material dispenser of FIG. 3 along cross-section lines A-A of FIG. 3, the back wall of the dispenser housing being mounted to an even supporting surface.
Figure 8:
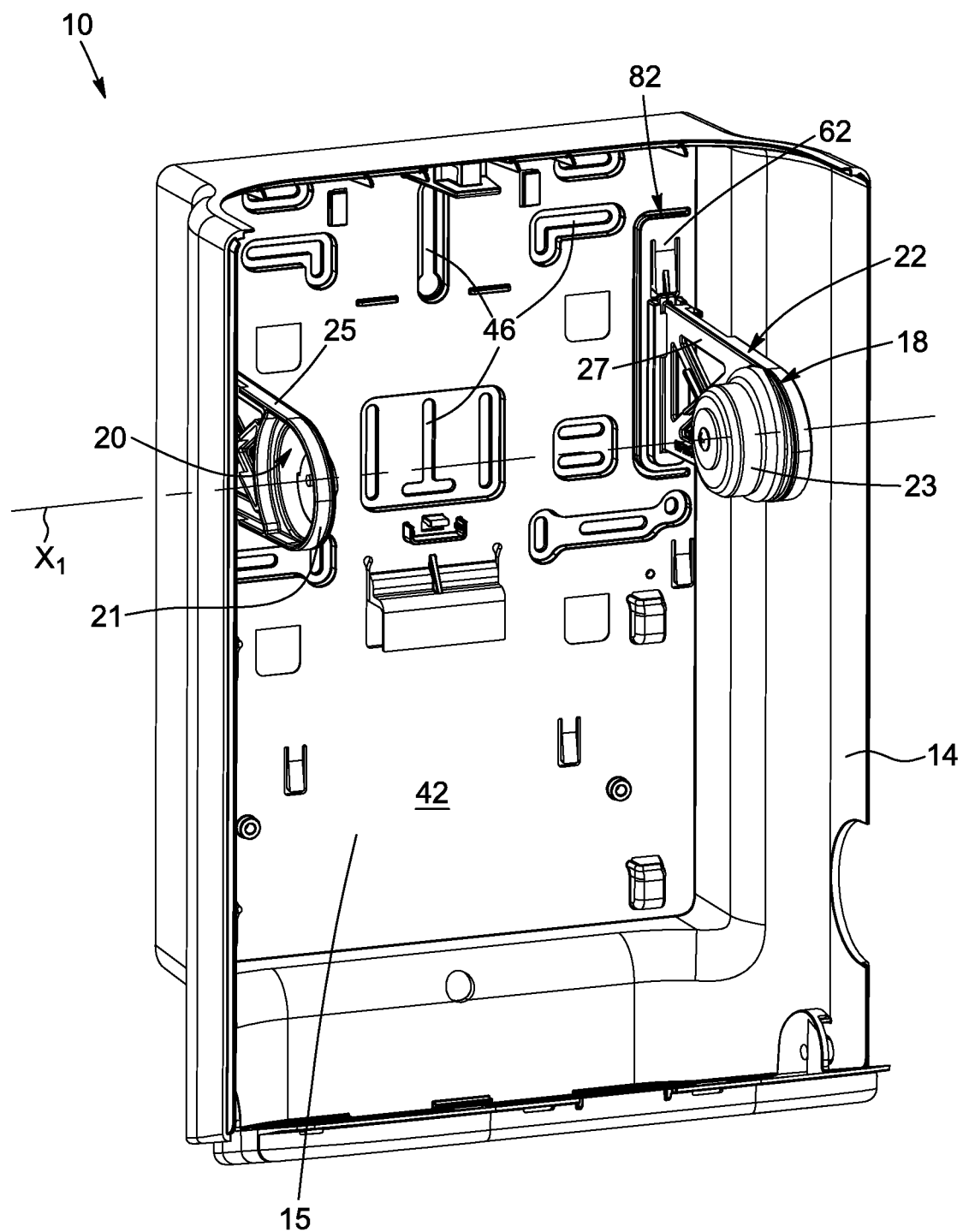
FIG. 8 is front perspective view of the web material dispenser of FIG. 4.

In the embodiment shown, as represented for instance in FIGS. 4, 5 and 8, the web material support assembly 18 comprises first and second web material support arms 20, 22 (or first and second web material supporting members 20, 22).

Each of the first and second web material support arms 20, 22 comprises a roll support (or first and second roll engagement portions) 21, 23, located at a roll receiving end of the first and second web material support arms 20, 22, configured to cooperate with a respective one of the first and second ends 102, 104 of the web material supply 100. In the embodiment shown, the roll supports 21, 23 of the first and second web material support arms 20, 22 are configured to cooperate with the first and second opposed extremities 102, 104 of the web material supply 100 (or web material roll 100). In the embodiment shown, each of the roll supports 21, 23 has a cylindrical body, the cylindrical bodies of the roll supports 21, 23 of the first and second web material support arms 20, 22 being coaxial. In the embodiment shown, the two cylindrical bodies of the roll supports 21, 23 extend along the central axis X1 of the web material roll 100, when the web material roll 100 is supported by the web material support assembly 18. In other words, the roll supports 21, 23 of the first and second web material support arms 20, 22 are substantially aligned with each other. It is thus understood that, for the web material support assembly 18 to be adequately configured to efficiently and smoothly deliver a portion of the web material supply 100, the first and second roll engagement portions 21, 23 have to be substantially coaxial with each other, as well as substantially coaxial with the central axis X1 of the web material supply 100.

In the embodiment shown, the first and second web material support arms 20, 22 are deflectable outwardly (considered with regard to the dispensing chamber 9 of the web material dispenser) (for instance at least the first and second roll engagement portions 21, 23 are deflectable outwardly) in order to allow (or at least ease) an insertion of the web material supply between the first and second web material support arms 20, 22.

Figure 6:
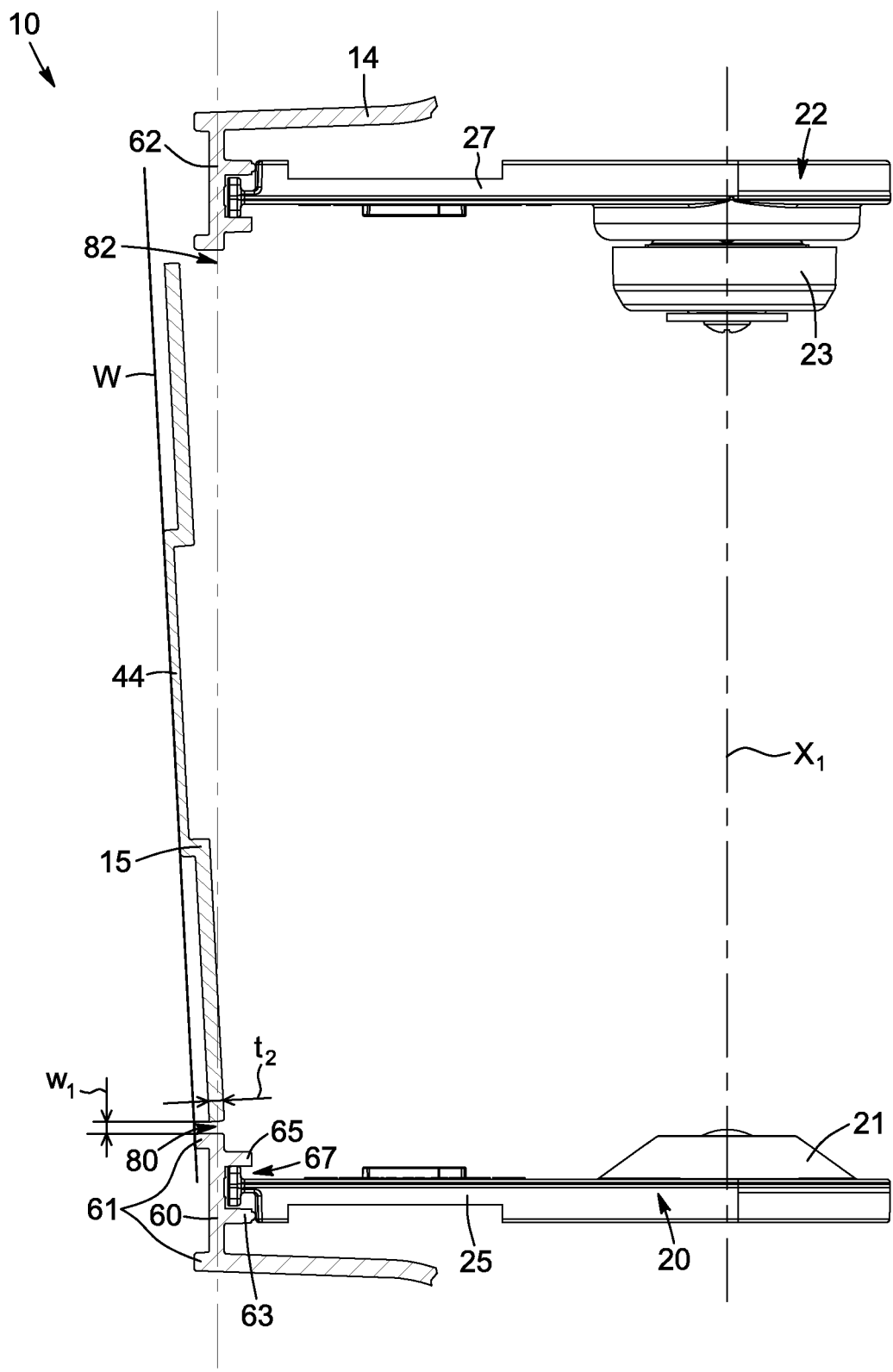
FIG. 6 is a sectional view of a section of the web material dispenser of FIG. 4 along cross-section lines B-B of FIG. 4, the back wall of the dispenser housing being mounted to an uneven supporting surface.

Moreover, at a rear end thereof, each of the first and second web material support arms 20, 22 comprises a mounting portion 25, 27 configured to mount the first and second web material support arms 20, 22 to the dispenser housing 12. In the embodiment shown, the mounting portions 25, 27 are configured to be mounted to the back wall 15 of the base part 14 of the dispenser housing 12. In the embodiment shown, as represented in FIGS. 5 and 6, the mounting portions 25, 27 are rear segments of the first and second web material support arms 20, 22. The rear segments of the first and second web material support arms 20, 22 extend substantially parallel to each other when the first and second web material support arms 20, 22 are mounted to the back wall 15, substantially transversally to the central axis X1 of the web material roll 100, when the web material roll 100 is supported by the web material support assembly 18. In the embodiment shown, the mounting portions 25, 27 extend substantially perpendicularly to the central axis X1 of the web material roll 100, when the web material roll 100 is supported by the web material support assembly 18. In the embodiment shown, each mounting portion 25, 27 is substantially planar and extends substantially vertically, with the roll supports 21, 23 extending substantially perpendicularly to the mounting portions 25, 27. In the embodiment shown, the roll supports 21, 23 extend inwardly towards one another, to receive and support a respective one of the first and second extremities 102, 104 of the web material roll 100. With respect to the mounting portions 25, 27, the roll supports 21, 23 thus protrude inwardly from their respective one of the first and second web material support arms 20, 22. In other words, the roll supports 21, 23 (or first and second roll engagement portions 21, 23) of the first and second web material support arms 20, 22 (or first and second web material supporting members 20, 22) are thus secured to the dispenser housing 12 (to the back wall 15 thereof, in the embodiment shown) via the mounting portions 25, 27.

It is appreciated that the shape, the configuration, and the location of the web material support assembly 18, and in particular the shape, the configuration and the location of the first and second web material support arms 20, 22, including their roll supports 21, 23 and their mounting portions 25, 27, can vary from the embodiment shown.

Back Wall

In the embodiment shown, the back wall 15 of the dispenser housing 12 is substantially planar and has a back wall surface. In the embodiment shown, the back wall 15 has a substantially rectangular shape. The back wall 15 thus comprises, in the non-limitative embodiment shown, a top edge 70, an opposed bottom edge 72, extending substantially parallel to the top edge 70, and a first and second lateral edges 74, 76 extending substantially parallel to each other, and transversally to (substantially perpendicularly to, in the embodiment shown) and between the top and bottom edges 70, 72. In the embodiment shown, when the web material dispenser 10 is mounted to the supporting surface W, the top and bottom edges 70, 72 of the back wall 15 extend substantially horizontally.

As represented in FIG. 4, in the embodiment shown, the back wall 15 has a height h considered along a substantially vertical direction when the web material dispenser 10 is mounted to the supporting surface W, and a width w considered along a substantially horizontal direction when the web material dispenser 10 is mounted to the supporting surface W. In the embodiment shown, as represented in FIG. 4, the back wall surface of the back wall 15 is dividable, along its height h, into an upper portion 50 and the above-mentioned lower portion 51. The back wall surface of the back wall 15 is also dividable, along its width w, into a central portion 52 extending between first and second lateral portions 54, 56, arranged respectively in the vicinity of the first and second lateral edges 74, 76.

The back wall 15 comprises a rear face 40 (or outer face 40, considered with respect to the dispensing chamber 9), as represented in FIG. 2, that is configured to face the supporting surface W when the web material dispenser 10 is mounted to the supporting surface W, and an opposed front face 42 (or inner face 42, considered with respect to the dispensing chamber 9), that is configured to form a part of an interior surface of the dispensing chamber 9.

In the non-limitative embodiment shown, the rear and front faces 40, 42 extend substantially parallel to each other, and the back wall 15 has a thickness defined between the rear face 40 and the front face 42. As detailed below, the thickness of the back wall 15 can vary along the width w and/or the height h of the back wall surface.

As represented in FIG. 4, the back wall surface of the back wall 15 is dividable into at least a fastening portion 44 that is configured to mount the back wall 15 to the supporting surface W, and first and second support arm portions 60, 62 for respectively the first and second web material support arms 20, 22 to be mounted thereto (to the front—or inner—face thereof). In the embodiment shown, the fastening portion 44 and the first and second support arm portions 60, 62 are arranged so as to define a symmetrical central axis X2 of the back wall 15. In the embodiment shown, the symmetrical axis X2 is substantially vertical when the web material dispenser 10 is mounted to the supporting surface W. In the following description, the terms front face (or inner face) and rear face (or outer face) will apply either to the back wall 15, or to sections thereof (for instance to the fastening portion 44 or to the first and/or second support arm portions 60, 62).

Fastening Portion

In the embodiment shown, the fastening portion 44 extends in the central portion 52 of the upper portion 50 of the back wall surface, and along substantially the entire width w of the back wall surface in the lower portion 51 of the back wall surface. In other words, in the embodiment shown, the fastening portion 44 has a substantially inverted T-shape. It is appreciated that the shape, the dimensions, and the location of the fastening portion 44 in the back wall surface can vary from the embodiment shown.

In the embodiment shown, the fastening portion 44 comprises a plurality of connection structures 46 configurable to mount the back wall 15 to the supporting surface W. For instance, the connection structures 46 comprises holes 48 extending between the front and rear faces 42, 40 of the fastening portion 44 that are configured to cooperate with mechanical fasteners, such as screws, and holes formed in the supporting wall W so as to mount the back wall 15 to the supporting wall W. The connection structures 46 can also comprise apertures opening into the rear face 40 that are dimensioned to cooperate with connection devices, such as hooks (not represented) extending from the supporting wall W. In another non-limitative embodiment, the connection structures 46 can also comprise hooks protruding outwardly from the rear face 40.

It is appreciated that the shape, the configuration, and the location of the connection structures 46 can vary from the embodiment shown. It is also appreciated that the number and the configuration of the connection structures 46, as well as their location with regard to the back wall 15 will depend on the structure and the weight of the web material dispenser 10, as well as on the features of the supporting surface W.

First and Second Support Arm Portions

In the embodiment shown, the first and second support arm portions 60, 62 are located in the first and second lateral portions 54, 56 of the upper portion 50 of the back wall surface of the back wall 15, respectively in the vicinity of the first and second lateral edges 74, 76 of the back wall 15 (inwardly thereof). In other words, in the embodiment shown, the first and second support arm portions 60, 62 are located in the opposed first and second lateral portions 54, 56, arranged on each side of the central portion 52 of the upper portion 50 comprising at least some of the connection structures 46 of the fastening portion 44. In yet other words, the fastening portion 44 (the upper portion thereof, in the embodiment shown) at least partially extends between the first and second support arm portions 60, 62.

In the embodiment shown, the first and second support arm portions 60, 62 have a symmetrical shape, considered on each side of the central axis X2 of the back wall 15, so that the following description of the first support arm portion 60 will also apply to the second support arm portion 62. In another embodiment (not shown), the first and second support arm portions 60, 62 can have different shapes and/or dimensions from each other.

In the embodiment shown, the first support arm portion 60 is substantially rectangular. The first support arm portion 60 thus has an outer periphery comprising top and bottom sides 90, 92 extending substantially parallel to each other (substantially horizontally, in the embodiment shown), and distal and proximal lateral sides 94, 96 substantially parallel to each other, and extending transversally to (in the embodiment shown, substantially perpendicularly to) and between the top and bottom sides 90, 92. The distal lateral side 94 is located away from the fastening portion 44 while the proximal lateral side 96 partially delimits the first support arm portion 60 with the fastening portion 44 (i.e. the proximal lateral side 96 partially circumscribes the first support arm portion 60 from the fastening portion 44).

In some embodiments, the first support arm portion 60 extends along at least about 10% of the height h of the back wall 15. In some other embodiments, the first support arm portion 60 extends along at least about 25% of the height h of the back wall 15. In yet some other embodiments, the first support arm portion 60 extends along at least about 40% of the height h of the back wall 15.

In some embodiments, the first support arm portion 60 extends along at least about 2% of the width w of the back wall 15. In some other embodiments, the first support arm portion 60 extends along at least about 5% of the width w of the back wall 15. In yet some other embodiments, the first support arm portion 60 extends along at least about 10% of the width w of the back wall 15.

In some embodiments, the first support arm portion 60 has an area that represents at least about 1% of a total area of the back wall 15. In some other embodiments, the area of the first support arm portion 60 represents at least about 3% of the total area of the back wall 15.

As represented in FIGS. 2 and 6, in the embodiment shown, the first support arm portion 60 comprises a peripheral ridge 61 protruding rearwardly from the rear face 40 and extending along a portion of the outer periphery of the first support arm portion 60. In the embodiment shown, the peripheral ridge 61 extends along the top and bottom sides 90, 92 and the proximal lateral side 96.

Moreover, as represented in FIG. 6, the first support arm portion 60 further comprises distal and proximal stiffening ridges 63, 65 protruding forwardly from the front face 42, extending substantially parallel to each other (substantially vertically, in the embodiment shown) and defining therebetween a support arm-receiving slot 67 shaped and dimensioned to at least partially receive the mounting portion 25 of the first web material support arm 20. The distal and proximal stiffening ridges 63, 65 contribute to the stability of the mounting of the first web material support arm 20 to the first support arm portion 60.

It is appreciated that the shape, the dimensions, and the location of the first and second support arm portions 60, 62 in the back wall 15 can vary from the embodiment shown. In particular, and amongst others, the shape, dimensions, and locations of the first and second support arm portions 60, 62 can depend on the web material supply 100 to be supported by the web material support assembly 18, on the dimensions and the structure of the first and second web material support arms 20, 22 and on the dimensions and the structure of the back wall 15.

Flexible Junctions (or Weakness-Providing Junctions or Isolating Recesses)

The back wall 15 further comprises first and second flexible junctions 80, 82 extending between a peripheral border of the fastening portion 44 and respectively the first and second support arm portions 60, 62 to at least partially physically isolate the first and second support arm portions 60, 62 from the fastening portion 44.

In the embodiment shown, the first and second flexible junctions 80, 82 have a symmetrical shape, considered on each side of the central axis X2 of the back wall 15, so that the following description of the first flexible junction 80 will also apply to the second flexible junction 82.

Figure 7:
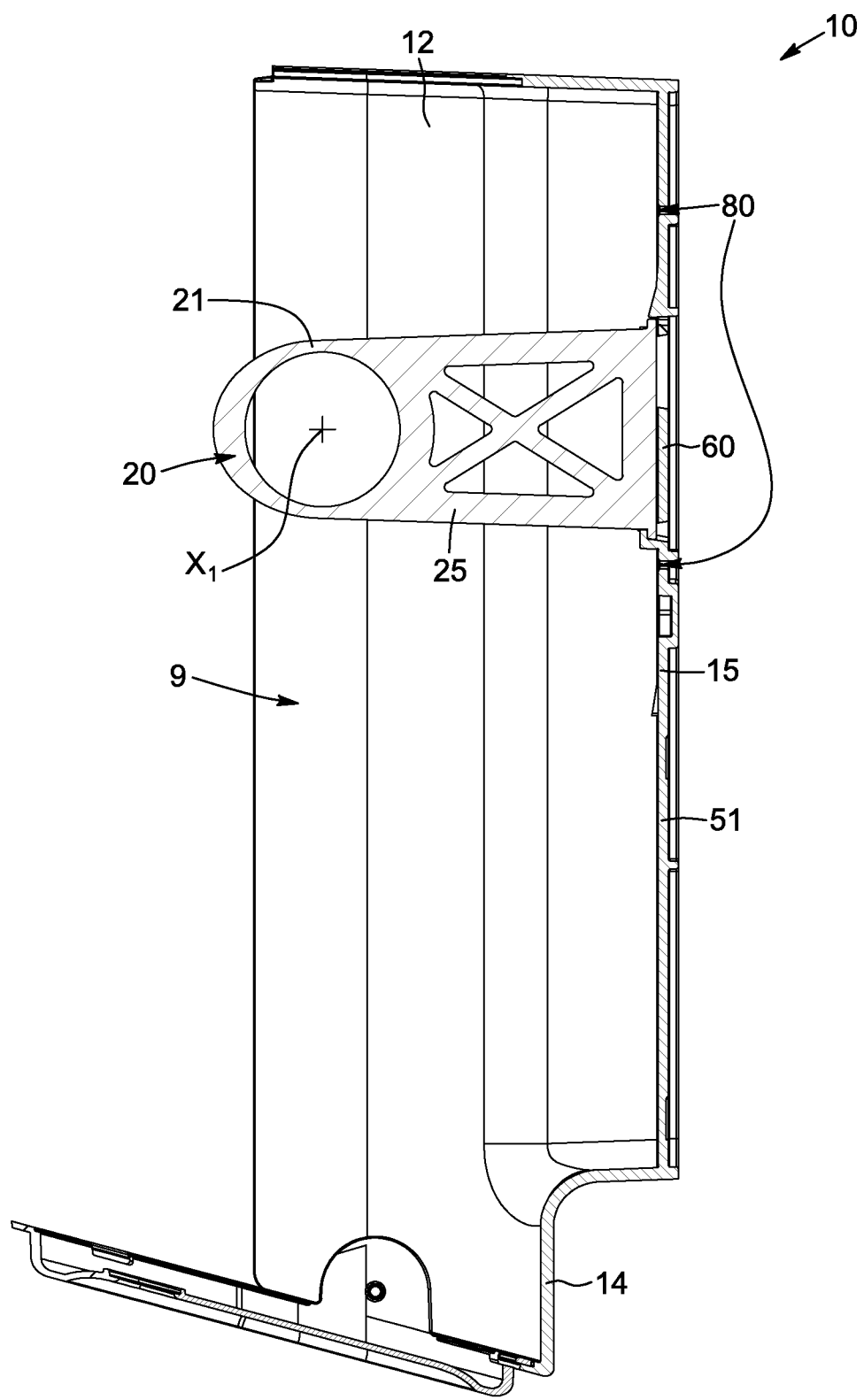
FIG. 7 is a sectional view of the web material dispenser of FIG. 4 along cross-section lines C-C of FIG. 4.

The first flexible junction 80 (or first isolation strip 80 or first weakness-providing junction 80 or first isolating recess 80) is configured to physically at least partially isolate at least a portion of the outer periphery of the first support arm portion 60 from the fastening portion 44. In other words, the first flexible junction 80 is configured to partially surround the first support arm portion 60. A remaining portion of the outer periphery of the first support arm portion 60 is physically linked to the dispenser housing 12, such as to another portion of the back wall 15 (for instance to another portion of the fastening portion 44 of the back wall 15, in the embodiment shown). The first flexible junction 80 is configured to form a weakness in the connection between the first support arm portion 60 and the fastening portion 44 so as to allow the first support arm portion 60 to be tilted (or bent, or pivoted) with respect to the fastening portion 44. The first flexible junction 80 can be an entire discontinuity along at least a portion of the outer periphery of the first support arm portion 60, i.e. a cut out formed in the back wall 15 (as represented for instance in FIGS. 5 to 7), or a partial reduction in the thickness of the back wall 15 along at least a portion of the outer periphery of the first support arm portion 60 (as detailed below with reference to FIG. 11).

In the embodiment shown, as represented in FIG. 3, the first flexible junction 80 is horizontally offset from the first lateral edge 74 of the back wall 15. For instance, the first flexible junction 80 is horizontally offset from the first lateral edge 74 from a connection width cw being less than about 5% of the width w of the back wall 15. In some other embodiments, the connection width cw is less than about 2% of the width of the back wall 15.

In the embodiment shown, the first flexible junction 80 is configured to physically at least partially isolate the first support arm portion 60 from the fastening portion 44 along a portion of the top and bottom sides 90, 92 and substantially entirely along the proximal lateral side 96, i.e. along a junction with the fastening portion 44, of its outer periphery. The first support arm portion 60 is physically connected to the dispenser housing 12 along the distal lateral side 94, distal from the fastening portion 44. In some other embodiments (not shown), the first flexible junction 80 is configured to physically at least partially isolate the first support arm portion 60 from the fastening portion 44 along at least a portion of at least one of the top side 90, the bottom side 92 and the proximal lateral side 96 of the outer periphery of the first support arm portion 60.

In some embodiments, the first flexible junction 80 is configured to at least partially physically isolate at least about 15% of a length of the outer periphery of the first support arm portion 60 from the fastening portion 44. In some other embodiments, the first flexible junction 80 is configured to at least partially physically isolate at least about 40% of the length of the outer periphery of the first support arm portion 60 from the fastening portion 44. In some other embodiments, the first flexible junction 80 is configured to at least partially physically isolate at least about 65% of the length of the outer periphery of the first support arm portion 60 from the fastening portion 44. In yet some other embodiments, the first flexible junction 80 is configured to physically at least partially isolate at least about 80% of the length of the outer periphery of the first support arm portion 60 from the fastening portion 44.

Figure 10:
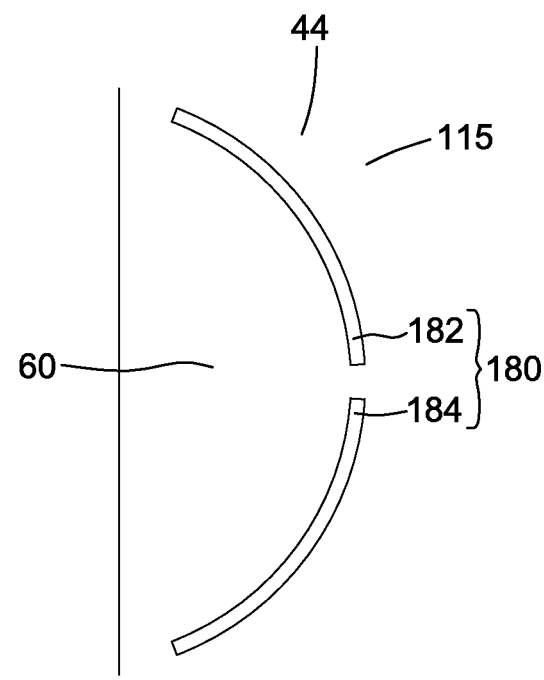
FIG. 10 is an enlarged front elevation view in accordance with another embodiment of the back wall of the web material dispenser.

In the embodiment shown, the first flexible junction 80 comprises two substantially horizontal segments 81, 83 and a substantially vertical segment 84 extending between the horizontal segments 81, 83. Arcuate portions are formed in the junction between each of the two substantially horizontal segments 81, 83 and the substantially vertical segment 84. In other words, in the embodiment shown, the first flexible junction 80 comprises a substantially inverted-C-shaped segment. It is understood that the shape of the first flexible junction 80 is not limited to the embodiment shown: for instance, and without being limitative, the first flexible junction 80 can comprise a L-shaped segment, one ore more linear segments, first and second linear segments extending in two inclined directions, first and second linear segments extending substantially perpendicularly to each other, one or more arcuate segments extending between liner segments, or any combination thereof. For instance and without being limitative, as represented in FIG. 10, the first flexible junction 180 of the back wall 115 might comprise two arcuate segments 182, 184 separated from each other.

In the embodiment shown, the first flexible junction 80 is formed at least partially by an isolation recess (or isolating strip or isolating recess) extending between the front and rear faces 42, 40 of the back wall 15.

Figure 9:
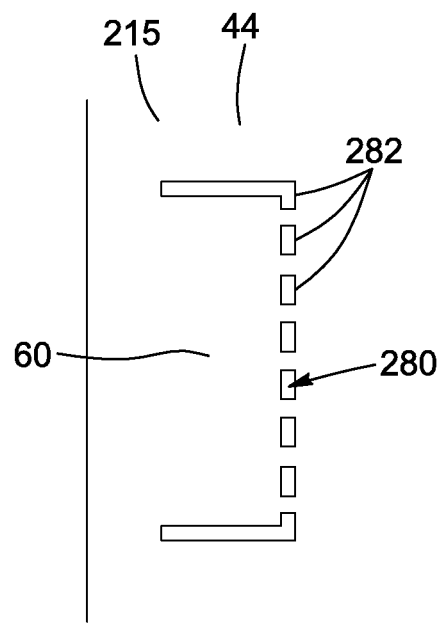
FIG. 9 is an enlarged front elevation view in accordance with another embodiment of the back wall of the web material dispenser.

In the embodiment shown, the isolation recess of the first flexible junction 80 extends entirely through the back wall 15 to define a discontinuity (an elongated through hole) therein. Thus, the isolation recess extends integrally between the front and rear faces 40, 42 of the back wall 15. In other words, a cut-out is formed in the back wall 15 between the first support arm portion 60 and the fastening portion 44, the cut-out constituting at least partially the first flexible junction 80. In some other embodiments, as represented in FIG. 9, the first flexible junction 280 of the back wall 215 can comprise a plurality of spaced-apart of cut-outs 282, or a combination of cut-outs and perforations separated (or spaced-apart) from each other.

Figure 11:
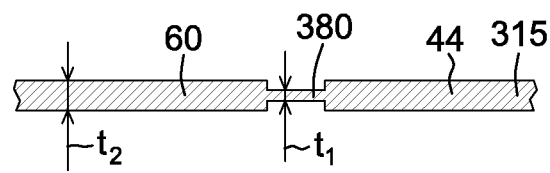
FIG. 11 is a sectional view of a section of a back wall of the web material dispenser in accordance with another embodiment.

The present disclosure is not limited to embodiments of the back wall 15, 115, 215 in which the weakness-providing junction 80, 180, 280 circumscribing the first support arm portion 60 from the fastening portion 44 would be formed by cut-outs extending between the rear and front faces 40, 42 of the back wall 15, 115, 215. For instance, as represented in FIG. 11, the weakness-providing junction 380 of the back wall 315 may be thinner than the areas of the fastening portion 44 and the first support arm portion 60 bordering—or surrounding—the weakness-providing junction 380. In some embodiments, a thickness t1 of the weakness-providing junction 380 is less than about 95% of a thickness t2 of the areas of the fastening portion 44 and the first support arm portion 60 bordering the weakness-providing junction 380. In some other embodiments, the thickness t1 of the weakness-providing junction 380 is less than about 90% of the thickness t2 of the areas of the fastening portion 44 and the first support arm portion 60 bordering the weakness-providing junction 380. In yet some other embodiments, the thickness t1 of the weakness-providing junction 380 is less than about 80% of the thickness t2 of the areas of the fastening portion 44 and the first support arm portion 60 bordering the weakness-providing junction 380.

The weakness-providing junction 380 of the back wall 315 could be formed in the same material as the one forming the first support arm portion 60 and/or the fastening portion 44. It could also be conceived a weakness-providing junction that would be formed in a material having rigidity properties different from rigidity properties of the first support arm portion 60 and/or the fastening portion 44. It could for instance be conceived a weakness-providing strip having a thickness substantially similar to the thickness of the areas of the fastening portion 44 and the first support arm portion 60 bordering the weakness-providing strip, but being at least partially made of a more flexible and/or elastic (resilient) material, In some embodiments, the isolation recess extends along at least about 25% of the thickness of the back wall 15, i.e. the isolation recess is defined by a reduction in the thickness of the back wall. In some other embodiments, the isolation recess extends along at least about 50% of the thickness of the back wall 15. In some other embodiments, the isolation recess extends along at least about 70% of the thickness of the back wall 15. In yet some other embodiments, the isolation recess extends along at least about 85% of the thickness of the back wall 15. In yet some other embodiments, the isolation recess extends along at least about 95% of the thickness of the back wall 15.

It is understood that the thickness of the back wall 15 is not necessarily constant over the back wall surface. The dimensions of the isolation recess and/or the weakness-providing junction should thus be understood with regard to the thickness of the back wall 15 in the vicinity of the first flexible junction 80. Moreover, the dimensions of the isolation recess can vary along a length of the first flexible junction 80, 180, 280, 380.

In the embodiment shown, as represented in FIG. 4, the first flexible junction 80 has a width w1, defined between the portion of the peripheral border of the fastening portion 44 and the portion of the outer periphery of the first support arm portion 60 between which the first flexible junction 80 extends. In some embodiments, as represented in FIG. 6, the width w1 of the first flexible junction 80 is substantially similar to the thickness t2 of the back wall 15 (considered at areas of the fastening portion 44 and the first support arm portion 60 bordering/surrounding the flexible junction 80). The width w1 of the first flexible junction 80 can vary along the length thereof.

It is thus understood that the first flexible junction 80, 180, 280, 380 is configured to at least partially physically isolate the first support arm portion 60 from the fastening portion 44. In other words, the first flexible junction 80, 180, 280, 380 is configured to allow the first support arm portion 60 to extend in a plane inclined with regards to the plane in which the fastening portion 44 extends. In yet other words, the first flexible junction 80, 180, 280, 380 is configured to provide a weakness in at least a portion of the connection between the first support arm portion 60 and the fastening portion 44 for the first support arm portion 60 to be tiltable with respect to the fastening portion 44. In yet other words, the back wall 15, 115, 215, 315 is at least partially foldable or bendable along at least a portion of the first flexible junction 80, 180, 280, 380.

The first flexible junction 80, 180, 280, 380 (or isolation strip 80, 180, 280, 380 or weakness-providing junction 80, 180, 280, 380) is thus configured to isolate the portion of the back wall 15, 115, 215, 315 supporting the first web material support arm 20 from the fastening portion 44 of the back wall 15, 115, 215, 315, thus defining a substantially free section of the back wall 15, 115, 215, 315.

Mounting of the Web Material Dispenser

For the web material dispenser 10 to efficiently and smoothly deliver a portion of the web material supply 100 to a user, it is important that the web material support assembly 18 be precisely positioned in the dispensing chamber 9. In particular, it is important that the first and second roll engagement portions 21, 23 of the first and second web material support arms 20, 22 be aligned with each other, and be spaced apart from each other by a pre-determined distance. However, in particular when the supporting surface W to which the web material dispenser 10 is mounted is uneven, the back wall 15 of the dispenser housing 12 can be deformed, thus resulting in a relative location of the first and second web material support arms 20, 22 that is inadequate (for instance, the roll engagement portions 21, 23 of the first and second web material support arms 20, 22 can become unaligned with each other and/or they can become separated by a distance different from the pre-determined distance).

By isolating at least one of the portions of the back wall 15 to which the first and second web material support arms 20, 22 are mounted (i.e. the first and second support arm portions 60, 62) from the fastening portion 44, the first and second flexible junctions 80, 82 allow the first and second web material support arms 20, 22 to be conveniently arranged with regard to each other, even when the web material dispenser 10 is mounted to an uneven supporting surface W, as represented in FIG. 6. In other words, the first and second flexible junctions 80, 82 (or first and second isolation strips) isolate the first and second web material support arms 20, 22 from the fastening constraints of the fastening portion 44 and torsions/tensions in the back wall 15 that could result.

The fastening portion 44 can thus undergo fastening constraints due to the supporting surface W being uneven, without the first and second support arms portions 60, 62 undergoing the same fastening constraints. In other words, the roll engagement portions 21, 23 of the first and second web material support arms 20, 22 can be kept substantially aligned with each other and separated from each other by the pre-determined distance even when the web material dispenser 10 is mounted to an uneven supporting surface W. The influence of an uneven mounting of the web material dispenser 10 on the web material dispensing performance is thus limited thanks to the first and second flexible junctions 80, 82.

The present disclosure thus also concerns a method for securing the web material dispenser 10 to the uneven supporting surface W. In the embodiment shown, the method comprises providing the web material dispenser 10 having the back wall 15 comprising the fastening portion 44, the first and second support arm portions 60, 62 with the first and second web material support arms 20, 22 secured thereto (more particularly with the roll engagement portions 21, 23—or first and second roll engagement portions—secured thereto via the mounting portions 25, 27 of the first and second web material support arms 20, 22), and the first isolating recess 80 partially surrounding the first support arm portion 60 from the fastening portion 44 to at least partially physically isolate the first support arm portion from the fastening portion. The method further comprises mounting the fastening portion 44 to the uneven support surface W. It is thus understood that, thanks in particular to the first isolating recess 80, the first support arm portion 60 can be tilted with respect to the fastening portion 44 for the first and second roll engagement portions 21, 23 so that the first and second roll engagement portions 21, 23 be substantially aligned with each other.

In the embodiment shown, it is understood that, in particular thanks to the second flexible junction 82, the second support arm portion 62 can also be tilted with respect to the fastening portion 44 for the first and second roll engagement portions 21, 23 to be substantially aligned with each other.

As represented in FIG. 6, even when the web material dispenser 10 is secured to the uneven supporting surface W, the first and second roll engagement portions 21, 23 are substantially coaxial with each other.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

What is claimed is:

1. A back wall for a web material dispenser having first and second web material support arms configured to be mounted to a supporting surface and support a web material supply, the back wall comprising:
    a rear face superposable to the supporting surface, and a front face, opposed to the rear face, the front and rear faces extending along a back wall surface, the back wall surface being dividable into:
    a fastening portion configured to secure the back wall to the supporting surface; and
    a first support arm portion engageable by the first web material support arm of the web material dispenser in a configuration wherein the first web material support arm extends forwardly from the front face of the back wall; and
    wherein the back wall further comprises a weakness-providing junction at least partially circumscribing the first support arm portion and separating the first support arm portion from the fastening portion for the first support arm portion to be tiltable with respect to the fastening portion.

2. The back wall according to claim 1, wherein the first support arm portion has an outer periphery, wherein the weakness-providing junction extends along at least about 15% of a length of the outer periphery and wherein the first support arm portion comprises a rear face and a peripheral ridge protruding rearwardly thereof and extending along at least a portion of the outer periphery.

3. The back wall according to claim 1, wherein the weakness-providing junction is thinner than the first support arm portion and the fastening portion.

4. The back wall according to claim 1, wherein the first support arm portion comprises a top side, a bottom side, and proximal and distal lateral sides extending between the top and bottom sides, and wherein the weakness-providing junction extends along at least a portion of at least one of the top, bottom and proximal lateral sides.

5. The back wall according to claim 1, wherein the first support arm portion is substantially rectangular and wherein the weakness-providing junction comprises first and second substantially horizontal segments and a substantially vertical segment extending between the first and second substantially horizontal segments.

6. The back wall according to claim 1, wherein the weakness-providing junction has a width corresponding substantially to a thickness of the back wall.

7. The back wall according to claim 1, wherein the back wall comprises a back wall surface dividable into a central portion and first and second lateral portions, the central portion extending between the first and second lateral portions, wherein the first support arm portion is located in the first lateral portion and wherein the fastening portion extends in the central portion of the back wall surface.

8. The back wall according to claim 1, wherein the back wall has a height and a width, wherein the first support arm portion extends along at least about 10% of the height of the back wall and along at least about 5% of the width of the back wall.

9. The back wall according to claim 1, wherein the back wall comprises first and second opposed lateral edges, wherein the first support arm portion is located in the vicinity of the first lateral edge and wherein the weakness-providing junction is horizontally offset from the first lateral edge.

10. The back wall according to claim 1, wherein the fastening portion comprises one or more connection structures configurable to mount the back wall to the supporting surface.

11. The back wall according to claim 1, wherein the back wall surface is further dividable into a second support arm portion for the second web material support arm to be mounted thereto in a configuration wherein it extends forwardly therefrom, the back wall further comprising an additional weakness-providing junction at least partially circumscribing the second support arm portion from the fastening portion for the second support arm portion to be tiltable with respect to the fastening portion.

12. The back wall according to claim 1, wherein the back wall comprises a rear face and a front face and wherein the weakness-providing junction comprises a cut-out formed in the back wall, the cut-out extending integrally between the rear face and the front face of the back wall.

13. The back wall according to claim 12, wherein the weakness-providing junction comprises a plurality of cut-outs spaced-apart from each other.

14. A web material dispenser for containing and dispensing a web material supply and being securable to a supporting surface, the web material dispenser comprising the first and second web material support arms and the
back wall according to claim 1, the first web material support arm being mounted to the first support arm portion of the back wall.

15. The web material dispenser according to claim 14, wherein each of the first and second web material support arms comprises a roll engagement portion, the roll engagement portions being substantially cylindrical and coaxial and being substantially aligned with each other when the back wall is secured to the supporting surface.

16. The web material dispenser according to claim 15, wherein each of the first and second web material support arms comprises a mounting portion, the roll engagement portions being secured to the back wall via a corresponding one of the mounting portions, and wherein the mounting portions extend substantially parallel to each other.

17. A back wall for a web material dispenser having first and second web material support arms configured to be mounted to a supporting surface and support a web material supply, the back wall comprising:
a rear face superposable to the supporting surface, and a front face, opposed to the rear face, the front and rear faces extending along a back wall surface, the back wall surface being dividable into
a fastening portion configured to secure the back wall to the supporting surface; and
a first support arm portion engageable by the first web material support arm of the web material dispenser;
wherein the back wall further comprises an isolating recess extending at least partially between the front and rear faces thereof, the isolating recess partially surrounding the first support arm portion to partially physically isolate the first support arm portion from the fastening portion.

18. The back wall according to claim 17, wherein the isolating recess comprises at least one cut-out formed in the back wall and extending at least partially between the front and rear faces.

19. The back wall according to claim 17, wherein the isolating recess physically isolates a portion of an outer periphery of the first support arm portion from the fastening portion while a remaining portion of the outer periphery of the first support arm portion is physically linked to the fastening portion.

20. The back wall according to claim 17, wherein the first support arm portion comprises a top side, a bottom side, and proximal and distal lateral sides extending between the top and bottom sides, wherein the isolating recess extends along at least a portion of at least one of the top, bottom and proximal lateral sides, wherein the first support arm portion is substantially rectangular and wherein the isolating recess comprises first and second substantially horizontal segments and a substantially vertical segment extending between the first and second substantially horizontal segments.

21. The back wall according to claim 17, wherein the isolating recess has a width corresponding substantially to a thickness of the back wall.

22. The back wall according to claim 17, wherein the back wall surface is dividable into a central portion and first and second lateral portions, the central portion extending between the first and second lateral portions, wherein the first support arm portion is located in the first lateral portion and wherein the fastening portion extends in the central portion of the back wall surface.

23. The back wall according to claim 17, wherein the back wall comprises first and second opposed lateral edges, wherein the first support arm portion is located in the vicinity of the first lateral edge of the back wall and wherein the isolating recess is horizontally offset from the first lateral edge.

24. The back wall according to claim 17, wherein the fastening portion comprises one or more connection structures configurable to mount the back wall to the supporting surface.

25. The back wall according to claim 17, wherein the back wall surface is further dividable into a second support arm portion for the second web material support arm to be mounted thereto, the back wall further comprising an additional isolating recess extending at least partially between the front and rear faces of the back wall, the additional isolating recess partially surrounding the second support arm portion to at least partially physically isolate the second support arm portion from the fastening portion.

26. A method for securing a web material dispenser to a supporting surface, comprising:
providing a web material dispenser having a back wall comprising a rear face and an opposed front face, the front and rear faces extending along a back wall surface, the back wall surface being dividable into a fastening portion and first and second support arm portions with first and second web material support arms engaged therewith, the first and second web material support arms comprising first and second roll engagement portions, the back wall further comprising a first isolating recess extending at least partially between the front and rear faces of the back wall and partially surrounding the first support arm portion to partially physically isolate the first support arm portion from the fastening portion; and superposing the rear face of the back wall to the supporting surface; and securing the fastening portion to the supporting surface.

* * * * *